(12) United States Patent
Leferink et al.

(10) Patent No.: US 11,647,759 B2
(45) Date of Patent: May 16, 2023

(54) CLOSED PROCESSING SYSTEM AND METHOD FOR TREATING ELONGATED FOOD PRODUCTS

(71) Applicant: MAREL TOWNSEND FURTHER PROCESSING B.V., Boxmeer (NL)

(72) Inventors: Bernardus Wilheimus Franciscus Leferink, Nijmegen (NL); Eric Henricus Johannes Aben, Ledeacker (NL); Hendrikus Cornelis Koos Van Doorn, Goch (DE); Johannes Martinus Meulendijks, Deurne (NL)

(73) Assignee: MAREL FURTHER PROCESSING B.V., Boxmeer (NL)

( * ) Notice: Subject to any disclaimer, the term of this patent is extended or adjusted under 35 U.S.C. 154(b) by 2 days.

(21) Appl. No.: 16/083,030

(22) PCT Filed: Mar. 8, 2017

(86) PCT No.: PCT/NL2017/050144
§ 371 (c)(1),
(2) Date: Sep. 7, 2018

(87) PCT Pub. No.: WO2017/155398
PCT Pub. Date: Sep. 14, 2017

(65) Prior Publication Data
US 2019/0098908 A1 Apr. 4, 2019

(30) Foreign Application Priority Data

Mar. 8, 2016 (NL) ...................................... 2016386

(51) Int. Cl.
*A23B 4/03* (2006.01)
*A23L 3/40* (2006.01)
*A23B 4/005* (2006.01)
*A23B 7/02* (2006.01)
*A23L 3/00* (2006.01)

(52) U.S. Cl.
CPC ............ *A23B 4/031* (2013.01); *A23B 4/0056* (2013.01); *A23B 7/0205* (2013.01); *A23L 3/001* (2013.01); *A23L 3/40* (2013.01)

(58) Field of Classification Search
CPC ..... A23B 4/031; A23B 4/0056; A23B 7/0205; A23B 4/03; A23B 5/02; A23B 5/022; A23B 9/08; A23B 5/025; A23B 7/02; A23B 7/0215; A23B 7/03; A23L 3/40; A23L 3/50; A23L 13/00; A23L 13/03; A23L 13/62; A23L 13/65; A23L 13/67; A23L 3/001; A23L 3/02; A23L 3/04; A23L 3/045; A23L 3/18; A23L 3/185; A23L 3/003; A23L 13/50; A23L 13/52; A23L 13/60; F26B 3/02; F26B 3/04; F26B 21/10; F26B 21/12; F26B 5/00; F26B 5/04; F26B 5/044; F26B 5/047; F26B 5/048; F26B 17/02; F26B 17/023; F26B 17/04; F26B 17/045; F26B 17/08; F26B 21/06; B01D 1/0082; B01D 1/0094
See application file for complete search history.

(56) References Cited

U.S. PATENT DOCUMENTS

| | | | | |
|---|---|---|---|---|
| 3,961,569 A * | 6/1976 | Kenyon | ..................... | A23L 3/01 99/451 |
| 5,942,265 A | 8/1999 | Roberds et al. | | |
| 6,068,874 A * | 5/2000 | Grocholski | ............ | A23B 4/031 34/196 |
| 6,075,922 A * | 6/2000 | Tay | ......................... | F26B 21/10 392/416 |
| 6,531,172 B2 * | 3/2003 | Perrine | ..................... | A23L 3/10 426/467 |
| 6,713,107 B2 * | 3/2004 | Shefet | ....................... | A21B 1/28 126/21 A |
| 10,130,115 B1 * | 11/2018 | Butler | ....................... | A23L 3/42 |
| 2005/0125102 A1 * | 6/2005 | Nichols | ..................... | F24F 11/30 700/276 |
| 2007/0240328 A1 * | 10/2007 | Moles | ..................... | F26B 23/02 34/218 |
| 2010/0275621 A1 * | 11/2010 | Oliveira, Jr. | ............ | A23L 21/25 62/93 |
| 2014/0193548 A1 * | 7/2014 | Godoy Varo | ......... | A23L 3/3445 426/231 |

(Continued)

FOREIGN PATENT DOCUMENTS

WO 2007032679 A1 3/2007
WO 2014066133 A1 5/2014

OTHER PUBLICATIONS

Pressure Drop NPL, published May 13, 2008, https://web.archive.org/web/20080513122016/https://www.captiveaire.com/manuals/airsystemdesign/designairsystems.htm (Year: 2008).*

(Continued)

*Primary Examiner* — Erik Kashnikov
*Assistant Examiner* — Bryan Kim
(74) *Attorney, Agent, or Firm* — Workman Nydegger

(57) ABSTRACT

The present invention relates to a closed processing system for treating elongated food products, comprising: a housing bounding a process space, a transport path for displacing the elongated food products through the process space, at least one airflow generator for generating an airflow in the process space, and at least one detector for detecting process conditions in the process space, wherein the detector includes at least one pressure sensor for detecting the relative airflow pressure in the process space compared to the ambient air pressure and wherein the system is arranged to control the process conditions by adjusting the at least one airflow generator based on the detected process conditions. The present invention further relates to a method for treating elongated food products.

11 Claims, No Drawings

(56) References Cited

U.S. PATENT DOCUMENTS

| | | | |
|---|---|---|---|
| 2014/0318166 A1* | 10/2014 | Loebach | B01D 53/265 62/238.7 |
| 2015/0157033 A1* | 6/2015 | Tardy | A23B 4/0056 426/403 |
| 2015/0367972 A1* | 12/2015 | Schmidt | A23L 3/40 426/531 |

OTHER PUBLICATIONS

Netherlands Search Report from Application No. NL 2016386, dated Jun. 17, 2016.
International Search Report and Written Opinion from PCT Application No. PCT/NL2017/050144, dated May 12, 2017.
International Preliminary Report on Patentability from PCT Application No. PCT/NL2017/050144, dated Apr. 19, 2018.

* cited by examiner

CLOSED PROCESSING SYSTEM AND METHOD FOR TREATING ELONGATED FOOD PRODUCTS

BACKGROUND

The present invention relates to a closed processing system for treating elongated food products. The present invention further relates to a method for treating elongated food products.

In the treatment of elongate food products, and more particularly sausages, there is, depending on the type of product, a need to condition the products. Several examples of conditioning are: drying and heating the products. In the production of larger quantities of food products use is usually made of continuous production lines, wherein the products for conditioning are preferably moved through a determined process space. Used for this purpose according to the prior art are vertically disposed process spaces through which a conveyor belt with products moves in helical manner. The advantage of drying towers is that they may provide a great drying capacity on a limited floor area. On the other hand, the existing drying towers are often less simple to place in a conventional manufacturing area, and they are less advantageous in terms of energy.

WO 2014/066133 discloses a process for manufacturing dry sausage comprising rapid partial drying of sausage logs. The process includes preparing a meat mixture, stuffing the meat mixture into a casing or mould, or extruding into moulds, to form sausage logs, fermenting the sausage logs, heat treating the sausage logs, placing the sausage onto a conveyor, passing the conveyor and sausage log through a chamber, and drying the partially-dried sausage logs. The process also includes introducing a supply of conditioned air into the chamber, and introducing a supply of microwaves into the chamber. The air supply and microwaves, as well as the drying conditions, are selected to reduce the moisture content of the meat to a predetermined moisture to protein ratio.

In order to provide an improved device for treating elongate food products in a process space with a conditioned airflow an alternative device has been described in International patent application WO 2007/032679 A1, wherein the feed opening and the discharge opening, arranged in the housing for respectively carrying food products into the process space and discharging thereof from the process space, are arranged in opposite and substantially horizontally spaced-apart sides of the housing. Thus, resulting in a device having a compact construction whereby the outer dimension of the device may be limited.

Despite the fact that drying systems, such as the drying towers and the drying device described above, have a great drying capacity, efficiently controlling the climate within such drying system is more difficult. For example, in order to increase the energy efficiency of drying systems, the heated air is re-used again by using return channels for air. By re-using heated air, the climate of the drying device slowly changes per loop of re-used heated air. For example, by re-using heated air, the humidity of the air used in the drying device will slowly increase per loop of re-used air resulting in a more and more less efficient drying process. In order to solve this problem, the drying devices of the prior art are provided with venting means in order to discharge at least a part of used heated air from the drying device.

However, unnecessary (needless) discharge of used heated air in order to reduce the humidity of the climate of the drying device is undesirable, since such unnecessary discharge of air result in an energy less efficient process.

SUMMARY

The object of the present invention is to provide an improved device for treating elongated food products, while retaining the advantages of the prior art, the elongated food products may be treated in more energy efficient manner.

The present invention provides for this purpose a closed processing system for treating elongated food products, comprising a housing bounding a process space, with a feed opening arranged in the housing and a discharge opening arranged in the housing for respectively carrying elongated food products into the process space and discharging elongated food products from the process space, a transport path for displacing the elongated food products through the process space, at least one airflow generator for generating an airflow in the process space, and at least one detector for detecting process conditions in the process space, wherein the detector includes at least one pressure comparison sensor for detecting the relative airflow pressure in the process space compared to the ambient air pressure, and wherein the system is arranged to control the process conditions by adjusting the at least one airflow generator based on the detected process conditions.

DETAILED DESCRIPTION OF VARIOUS EMBODIMENTS

It was found that by detecting the detecting the relative airflow pressure in the process space compared to the ambient air pressure and adjusting the airflow generated by the airflow generator based on the detected process conditions, the exchange of air in the process space with the environment may be minimalised within the required (and/or prescribed) process conditions. This relates minimising the exchange of air in two directions; the needless flow of air out of the process space and the needles flow of air into the process space. In case of for instance low atmospheric pressure (for instance an atmospheric pressure of 980-995 hPa) optimal pressure conditions in the processing system to limit the air exchange with the environment will be lower than in circumstances of high atmospheric pressure (for instance an atmospheric pressure of 1010-1040 hPa). The present invention enables thus not only optimises the conditions of treating elongated food products on an isolated bases by focussing on the elongated food products processing but also the environmental air pressure situation is included in the process optimisation. By thus reducing air exchange of the processing space with the environment energy may be saved and inconvenience for operates may be limited. However another important advantage of the present invention is that it enables a higher level of process control; as it enables to anticipate the treating of elongated food products onto varying environmental atmospheric pressure conditions. As for the processing system called a "closed processing system" a limited exchange of air between the environment and the processing space may not be prevented, for instance not at the feed opening and the discharge opening arranged in the housing for feeding and discharging the elongated food products into and out of the process space.

The detector may include at least one pressure sensor for detecting the decrease in airflow pressure through the process space. By controlling the airflow generator also based on the detected decrease in airflow pressure in the processing space a decrease in airflow pressure drop of subsequent processing loops may be controlled and therefore the process conditions in the process space, i.e. the climate of the process space, may additionally be kept within a range of predefined minimum and maximum process parameters even further limiting discharging air from the processing space and/or flowing ambient air uncontrolled into the processing space. Therefore, by defining the airflow based on the detected decrease in airflow pressure at different locations in the process space, the need to discharge air from the system may be further reduced resulting in a more energy efficient system. In fact, by detecting the decrease in airflow pressure in the process space based on which the flow of air is controlled, the system of the present invention may be considered a system that enables to keep the climate more constant (within a predefined process parameter range) for a prolonged period of time.

The pressure sensor for detecting the relative airflow pressure in the process space compared to the ambient air pressure may be provided with a valve for changing a connection of the pressure sensor with the process space and the ambient air. With such a construction with only a single pressure sensor the measurements outside and inside the processing space may be realised. A further advantage of the valve for changing a connection of the pressure sensor with the process space and the ambient air is that the functioning of the pressure sensor may be made independent of the temperature (or other environmental conditions affecting the functioning of the pressure sensor) as the detector is only used for recording relative pressure date. In other word the pressure sensor is calibrated with every switchover. Again this enhances the level of process control with all the advantage resulting from a higher process control as listed above. However as an alternative the pressure sensor for detecting the relative airflow pressure in the process space compared to the ambient air pressure may also be a double sensor connecting to the process space and connecting to the ambient air. In such construction the valve for changing a connection of the pressure sensor with the process space and the ambient air is superfluous resulting in a construction that may be more sold in specific circumstances wherein calibration of the pressure sensor(s) is not required.

The at least one airflow generator may be configured to control the speed of the generated airflow. In this respect, it is noted that the airflow generator not only increases the airflow speed, but may also be configured to decrease the airflow speed in case desired. For example, in case a less than required decrease in airflow pressure is detected in the process space, one could choose to decrease to speed of the airflow to increase the decrease in airflow pressure in the process space.

Preferably, the system of the present invention is arranged to maintain the decrease in airflow pressure in the range of [1000, 4000] Pa. More preferably, the system of the present invention is arranged to maintain the decrease in airflow pressure in the range of [1500, 3500] Pa or [2000, 3000] Pa. Optimum results are obtained by maintaining the decrease in airflow pressure about 2500 Pa.

In an embodiment of the present invention, the system may further comprise at least one airflow conditioner for conditioning the generated airflow. The at least one airflow conditioner may be configured to control the temperature and/or the humidity of the generated airflow. The climate of the process space may be controlled by changing the temperature and/or the humidity of the airflow to be supplied to the process space. For this purpose, the airflow conditioner of the present invention may be provided with heating and/or cooling means. For example the heating and/or cooling means may be a heat exchanger unit comprising a conduit for receiving a liquid, such as a coolant, and/or electrical heating means.

Furthermore, the airflow conditioner of the present invention may be provided with moistening means for supplying moisture to the airflow. The moistening means may be in the form of a nozzle connected to a water supply conduit for spraying droplets of water into the airflow.

As already described above, the system of the present invention comprises at least one detector for detecting process conditions in the process space, i.e. at least the decrease in airflow pressure through the process space. The detector may be configured to detect other process conditions, i.e. temperature and relative humidity, as well. Preferably, the detector of the present invention is configured to detect the process conditions in the process space continuously. By detecting the process conditions in the process space in a continuous manner, the system of the present invention is able to continuously dynamically control the climate of the process space.

Alternatively, the at least one detector of the present invention is configured to detect the process conditions in the process space at a predefined interval. In order to provide constant climate conditions of the food products to be treated, the predefined interval may equal the time needed to displace a food product through the process space.

In a further embodiment of the present invention, the at least one detector comprises a first sensor and a second sensor, wherein the first sensor is located in the process space nearby the feed opening and the second sensor is located in the process space nearby the discharge opening. By defining a first and second sensor, the detector of the present invention is able to obtain more detailed information about the process conditions at different locations in the process space. Based on the more detailed information, the specific airflow parameters, e.g. airflow speed, temperature and humidity, may be better controlled in order to obtain the desired climate in the process space.

The closed processing system may be any type of system for treating elongated food products. Preferably the closed processing system of the present invention is a drying cabinet.

The present invention further provides a method for treating elongated food products, comprising the steps of: a) providing elongated food products to be treated; b) carrying the provided elongated food products into the process space of the closed processing system of the present invention; c) generating an airflow in the process space; d) discharging the treated elongated food products from the process space; e) detecting process conditions in the process space; and f) controlling the process conditions in the process space, wherein step e) includes detecting the relative airflow pressure in the process space compared to the ambient air pressure and wherein the method further comprising the step of: adjusting the speed of the generated airflow in step f) based on the detected relative airflow pressure in step e).

As already described above, it was found that by detecting the relative airflow pressure in the process space compared to the ambient air pressure and adjusting the speed of the generated airflow based on the detected decrease in airflow pressure, a method for treating elongated food products may be provided with an increased energy efficiency, i.e. without the need of discharging air from the closed system, with less inconvenience for the environment and—very important—with a higher level of process control.

Step e) may also include detecting the decrease in airflow pressure through the process space. Such detection provides even more process information and thus further enhances the possibilities for process control.

The measurement of the airflow pressure in the process space and the ambient air pressure measurement may be succeeding discrete measurements enabling to use only a single detector for detecting the pressure both internally and externally. In such situation the process conditions may be detected at predefined intervals, in which situation, inherently, the airflow conditions may also be adjusted at such predefined intervals. In order to maintain a constant quality of the food products discharged from the process space, the predefined interval preferably is maximise at the time needed for carrying an elongated food product into the process space and discharging the treated elongated food product from the process space. As an alternative the measurement of the airflow pressure in the process space and the ambient air pressure measurement may also be dual continuously measurements.

In an embodiment of the present invention, the decrease in airflow pressure may be [1000, 4000] Pa. More preferably, the decrease in airflow pressure may be [1500, 3500] Pa or [2000, 3000] Pa. Optimum results are obtained wherein the decrease in airflow pressure is about 2500 Pa.

In an embodiment of the present invention, the speed of the generated airflow may be about [1, 7.5] m/s. Preferably, the speed of the generated airflow may be about [3, 7.3] m/s, more preferred about [5, 7] m/s. Optimum results may be obtained with a generated airflow having a speed of about 6.5 m/s.

The invention claimed is:

1. A processing system for treating elongated food products, the processing system arranged to maintain a constant climate in a controllable manner for a prolonged period of time, the processing system comprising:
   a housing bounding a process space, with a feed opening arranged in the housing and a discharge opening arranged in the housing for respectively carrying elongated food products into the process space and discharging elongated food products from the process space;
   a transport path for displacing the elongated food products through the process space;
   at least one airflow generator for generating an airflow in the process space, the at least one airflow generator being configured to control speed of the generated airflow; and
   at least one detector for detecting process conditions in the process space;
   wherein the at least one detector includes at least one pressure sensor for detecting a relative airflow pressure in the process space compared to ambient air pressure, and
   wherein the at least one detector further comprises a feed opening pressure sensor and a discharge opening pressure sensor, wherein the feed opening pressure sensor is located adjacent the feed opening and the discharge opening pressure sensor is located adjacent the discharge opening, the feed opening and discharge opening pressure sensors being configured to determine a decrease in airflow pressure in the process space;
   wherein the system is arranged to control the process conditions by adjusting the at least one airflow generator based on the detected process conditions;
   wherein when a low ambient air pressure between approximately 980 and 995 hPa is detected, the at least one airflow generator is controlled to provide a decreased airflow pressure in the process space by decreasing the airflow speed, and when a high ambient air pressure between approximately 1010 and 1040 hPa is detected, the at least one airflow generator is controlled to provide an increased airflow pressure in the process space by increasing the airflow speed, thereby minimizing an exchange of air between the process space and the ambient air.

2. The system according to claim 1, wherein the at least one pressure sensor for detecting the relative airflow pressure in the process space compared to the ambient air pressure is provided with a valve for changing a connection of the pressure sensor with the process space and the ambient air.

3. The system according to claim 1, wherein the at least one pressure sensor for detecting the relative airflow pressure in the process space compared to the ambient air pressure is a double sensor connecting to the process space and connecting to the ambient air.

4. The system according to claim 1, wherein the system further comprises at least one airflow conditioner for conditioning the generated airflow.

5. The system according to claim 4, wherein the at least one airflow conditioner is configured to control temperature of the generated airflow or humidity of the generated airflow.

6. The system according to claim 1, wherein the processing system is a drying cabinet.

7. The system according to claim 1, wherein the system is arranged to maintain the decrease in airflow pressure in a range of 1500 to 3500 Pa.

8. The system according to claim 1, wherein the system is arranged to maintain the decrease in airflow pressure in a range of 2000 to 3000 Pa.

9. The system according to claim 1, wherein the system is arranged to maintain the decrease in airflow pressure at about 2500 Pa.

10. The system according to claim 1, wherein the speed of the generated airflow is 1 to 7.5 m/s.

11. The system according to claim 1, wherein the speed of the generated airflow is about 6.5 m/s.

\* \* \* \* \*